Feb. 9, 1926.

A. E. PETERS 1,572,557

CLUTCH MECHANISM FOR HOIST CONTROL

Filed March 12, 1924  2 Sheets-Sheet 1

INVENTOR
Arthur E. Peters
BY
Herbert G. Ogden
HIS ATTORNEY

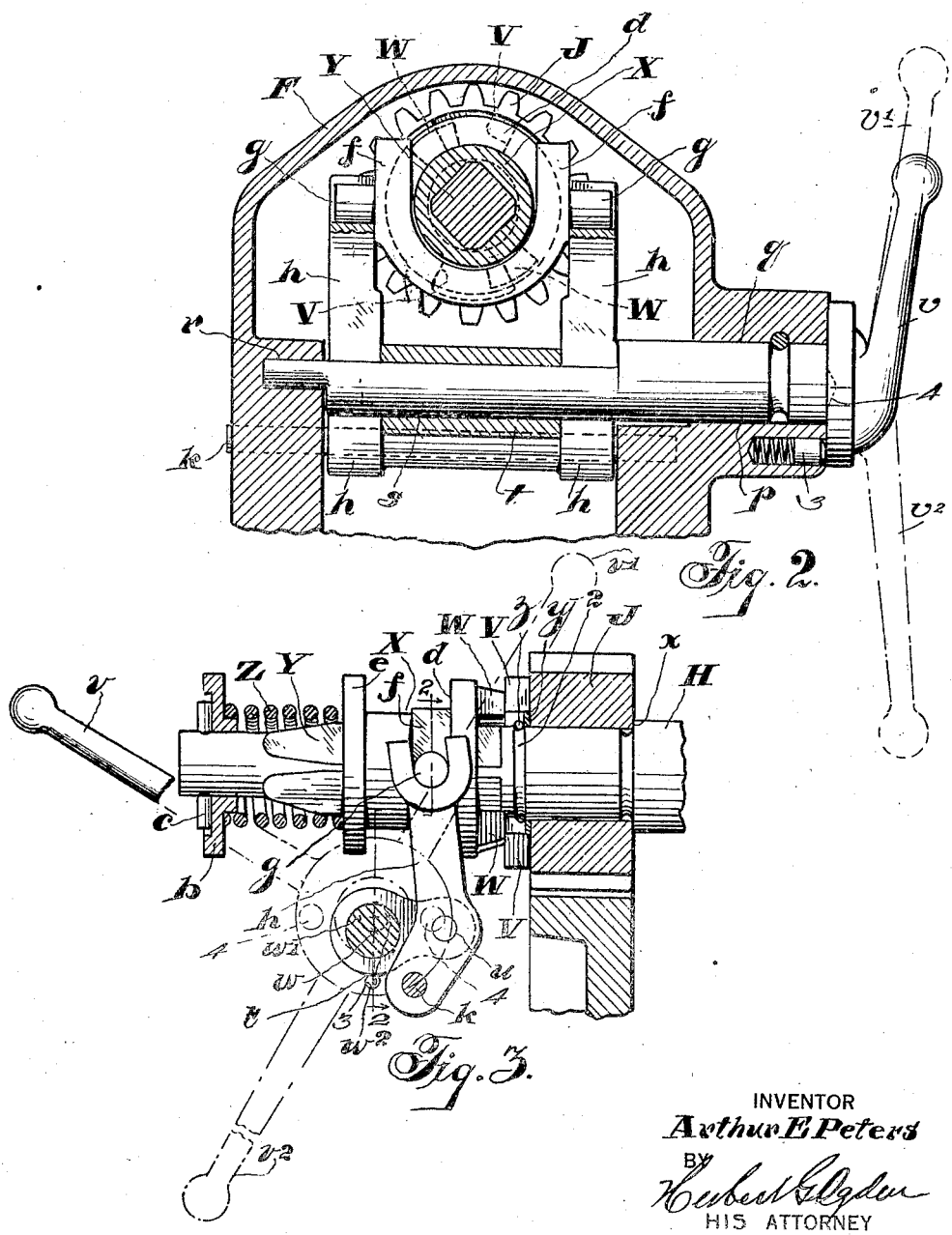

Patented Feb. 9, 1926.

1,572,557

UNITED STATES PATENT OFFICE.

ARTHUR E. PETERS, OF LITTLETON, COLORADO, ASSIGNOR TO INGERSOLL-RAND COMPANY, OF JERSEY CITY, NEW JERSEY, A CORPORATION OF NEW JERSEY.

CLUTCH MECHANISM FOR HOIST CONTROL.

Application filed March 12, 1924. Serial No. 698,603.

*To all whom it may concern:*

Be it known that I, ARTHUR E. PETERS, a citizen of the United States, and a resident of Littleton, county of Arapahoe, and State of Colorado, have invented a certain Clutch Mechanism for Hoist Control, of which the following is a specification, accompanied by drawings.

This invention relates to hoists and more particularly to a clutch mechanism for connecting and disconnecting the power driving mechanism with the rope drum.

In hoists which are provided with jaw clutches for connecting the driving mechanism with the drum, some difficulty has been experienced due to careless operation of the clutch operating mechanism. This trouble is generally due to the fact that the operator does not force the jaws of the clutch into engagement with each other quickly enough or far enough to secure proper engagement.

One object of this invention is to insure proper engagement between the jaws of the clutch by means which operates automatically.

The invention will be more clearly understood by referring to the drawing, which illustrates one form which it may assume in practice.

Figure 2 is a vertical cross section taken on the line 2—2 of Figure 1 looking in the direction of the arrows, and Figure 3 is a side view of the clutch and clutch operating mechanism on an enlarged scale.

Figure 1:
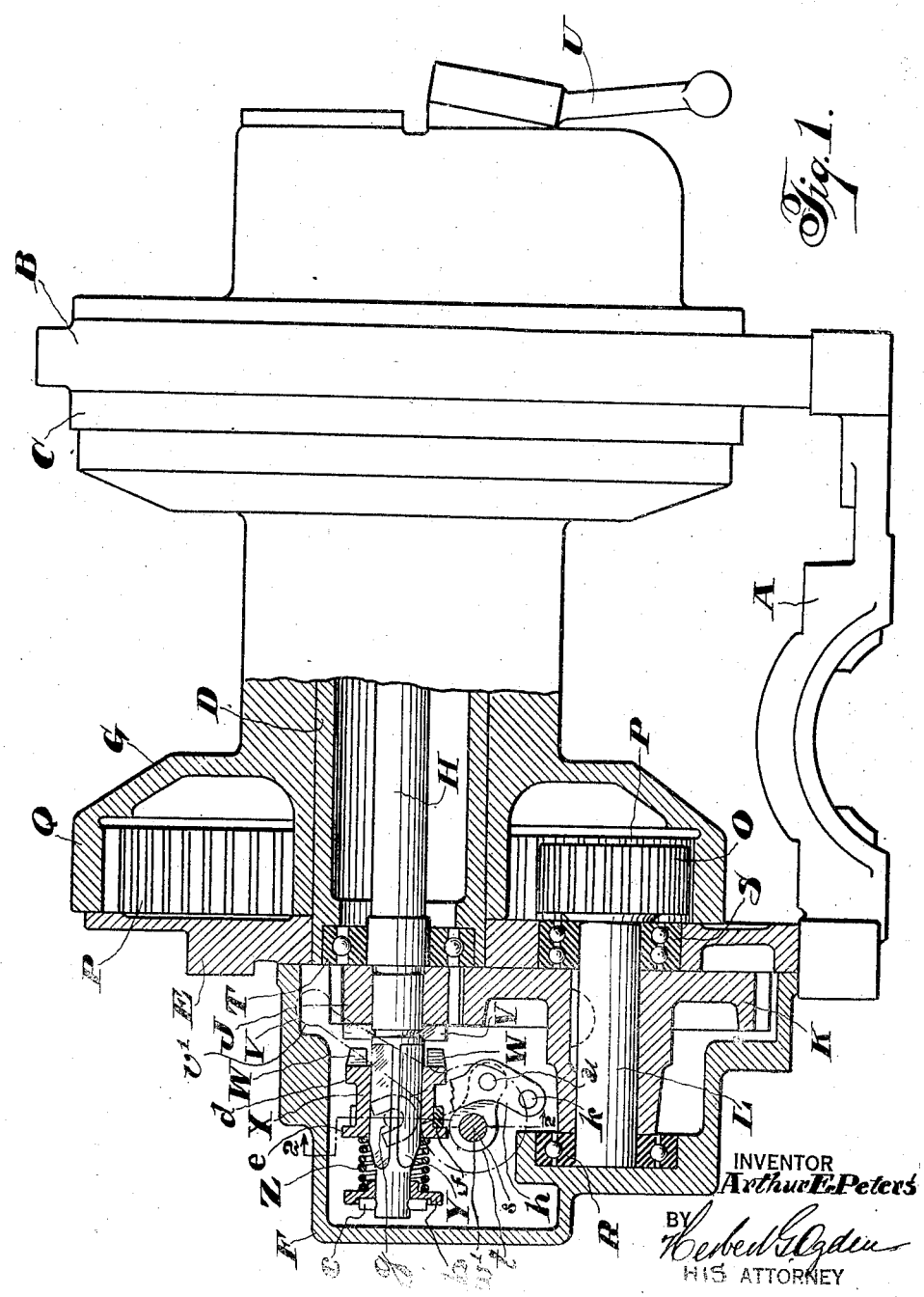
Figure 1 is a side elevation of a hoist constructed in accordance with the practice of the invention, parts being in section to show more clearly the internal arrangement of the clutch and transmission.

Referring to the drawings, the hoist includes a base A supporting at one end a housing B for a suitable motor such as for instance, a fluid actuated motor of the flat or square piston type. A flange C formed integrally with a center bearing D is attached to the motor housing B. The center bearing D extends to the opposite end of the base A and is supported in the gear case E, which has a gear case cover F enclosing the clutch assembly. The gear case cover F additionally provides a support for an intermediate gear shaft L. A rope drum G is rotatably mounted on the center bearing D and is driven by the motor through the driving shaft H, a clutch (described in detail hereinafter), driving pinion J, intermediate gear K, keyed to the shaft L, the intermediate pinion O and the internal gear P on the flange Q of the drum G. The intermediate gear shaft L is provided with a bearing R in the gear case cover F, and the bearing S in the gear case E. A bearing T for the driving shaft H is provided in the center bearing D. For controlling the motor (not shown), within the housing B there is provided a suitable throttle valve (not shown) having a lever U.

The clutch assembly is shown on an enlarged scale in Figures 2 and 3 and includes jaws V slotted in the outer face of the pinion J, which are adapted to be engaged by corresponding jaw teeth W on a sliding sleeve X mounted on the squared end Y of the drive shaft H. A coil spring Z is mounted on the squared end Y of the driving shaft and is retained in place by a washer $b$ in back of which is a pin $c$ passing through the shaft. The coil spring Z tends to force the sleeve X toward the pinion J and when the jaws and teeth V and W are in registry, the jaws are held in engagement. The sleeve X is provided with two spaced flanges $d$ and $e$. The flange $d$ provides a support for the jaw teeth W while the flange $e$ provides a bearing against which a clutch collar $f$ bears to compress the spring Z in the act of drawing the teeth and jaws W and V out of engagement with each other.

The clutch collar $f$ is shown more clearly in Figure 2 wherein are shown two trunnions $g$ provided on either side by means of which a forked clutch yoke $h$ operates to press the collar $f$ back against the flange $e$ to throw out the clutch. The yoke $h$ is pivoted on a stationary rod $k$ passing through the cover F. The yoke $h$ is actuated by means of a clutch lever $p$ journaled in the sides of the cover F at $q$ and $r$. The center portion $s$ of the lever $p$ is eccentric with respect to the journals $q$ and $r$ and forms a pivotal bearing for a short clutch link $t$ pivotally connected with a pin $u$ with the yoke $h$.

Thus when the clutch lever $p$ is rotated or moved through 180° clockwise by moving the operating handle $v$ to the dotted position $v'$ in Figure 3, the eccentric portion $s$ causes the link $t$ to pull the yoke $h$ with the attached collar $f$ backwardly against the flange $e$ of the sleeve X, compressing the spring Z and disengaging the jaws and teeth V and W. The center of the eccentric is drawn beyond dead center to a position $w'$, causing the collar $f$ to pull against the flange $e$ of the sleeve X to disengage the clutch. A suitable spring pressed stop 3 may be provided in the gear case F to cooperate with one of the sockets or depressions 4 in the clutch lever $p$ to hold the handle $v$ in either one of its two positions.

When it is desired to engage the clutch, the handle or lever $v$ is moved downwardly in a counterclockwise direction, from its upper position $v'$ in Figure 3 to the lower position $v^2$ whereupon the center of the eccentric assumes the position $w$ The collar $f$ then releases the sleeve X, permitting the spring Z to press the sleeve X into engaging position with the jaws and teeth V and W If the jaws and teeth V and W are in relative positions at which they do not engage, the teeth W will ride on the jaws V until the shaft H rotates to such a position that they will engage, whereupon the spring Z acting against the sleeve X causes them to drop into position with respect to each other The associated train of gears will then be connected with the drive shaft H When the clutch is engaged, the collar $f$ is out of contact with the flanges $d$ and $e$ and the spring Z holds the clutch against any tendency to back out, such as might be caused by the bevel of the faces of the jaws V or the teeth W due to wear The handle $v$ is then in the position $v^2$ and the stop 3 holds the handle in this position.

The pinion J is held against lateral movement on the shaft H on one side by the shoulder $x$ on said shaft and on the other by a washer $y$ held in position by a split ring $z$ let into the groove 2 on the periphery of the shaft H.

I claim:

1. In a hoist the combination of a drive shaft, a pinion loosely rotatable on said drive shaft and having a clutch jaw, a movable clutch member driven by the shaft and slidable longitudinally thereon to engage the clutch jaw of the pinion, a collar on the clutch member, a yoke pivoted at one end and at the other end engaging the collar, a link attached to the yoke, an eccentric cooperating with the link, a lever for operating the eccentric, a spring normally tending to hold the clutch member in engagement with the jaw on said pinion and a stop cooperative with the lever behind the dead center position of the eccentric whereby the clutch is held disengaged from the pinion against the force of said spring.

2. In a hoist the combination of a drive shaft, a pinion loosely rotatable on the said drive shaft and having a clutch jaw, a movable clutch member driven by the shaft and slidable longitudinally thereon to engage the clutch jaw of the pinion, a collar on the clutch member, a yoke pivoted at one end and at the other engaging the collar, a link attached to the yoke, an eccentric cooperating with the link, a lever for operating the eccentric, a spring encircling said shaft and normally tending to hold the clutch member in engagement with the jaw on said pinion, a retainer to hold the spring on said shaft, and a stop cooperative with the lever behind the dead center position of the eccentric whereby the clutch is held disengaged from the pinion against the force of said spring.

In testimony whereof I have signed this specification.

ARTHUR E. PETERS.